United States Patent
Yoneda

(10) Patent No.: US 8,073,488 B2
(45) Date of Patent: Dec. 6, 2011

(54) INFORMATION PROCESSING DEVICE, INFORMATION PROCESSING METHOD, AND PROGRAM

(75) Inventor: Atsuo Yoneda, Kanagawa (JP)

(73) Assignee: FeliCa Networks, Inc., Tokyo (JP)

( * ) Notice: Subject to any disclaimer, the term of this patent is extended or adjusted under 35 U.S.C. 154(b) by 496 days.

(21) Appl. No.: 12/260,112

(22) Filed: Oct. 29, 2008

(65) Prior Publication Data

US 2009/0130974 A1 May 21, 2009

(30) Foreign Application Priority Data

Nov. 19, 2007 (JP) ................... 2007-299793

(51) Int. Cl.
*H04B 1/38* (2006.01)
*H04M 1/00* (2006.01)
(52) U.S. Cl. ....... 455/557; 455/7; 455/67.11; 455/556.2
(58) Field of Classification Search .................. 455/558, 455/420, 418, 552.1, 557, 556.1, 556.2, 412.2, 455/550.1, 414.2, 11.1, 9, 13.1, 15, 67.11, 455/7; 370/350, 328, 513; 714/774
See application file for complete search history.

(56) References Cited

U.S. PATENT DOCUMENTS

2006/0117017 A1* 6/2006 Kawaguchi et al. ............ 707/10
2008/0174480 A1* 7/2008 Kimura et al. ............. 342/357.1
2009/0184799 A1* 7/2009 Ishibashi ....................... 340/5.8

FOREIGN PATENT DOCUMENTS

| JP | 2006-86738 | 3/2006 |
| JP | 2006-352392 | 12/2006 |
| JP | 2007-34987 | 2/2007 |
| JP | 2007-115194 | 5/2007 |

* cited by examiner

*Primary Examiner* — John J Lee
(74) *Attorney, Agent, or Firm* — Oblon, Spivak, McClelland, Maier & Neustadt, L.L.P.

(57) ABSTRACT

An information processing device that includes processing devices and a relay device. Each processing device has at least one processing function associated with a unique function information item, a function determination portion, and a device information item notification portion. The function determination portion determines whether the processing device includes a processing function that corresponds to a function information item received from the relay device. If the processing device has the processing function, the device information item notification portion transmits a device information item to the relay device. The relay device includes a storage portion that stores the device information items, a function information item transmission portion, and a device information item recording portion.

21 Claims, 7 Drawing Sheets

INFORMATION PROCESSING DEVICE, INFORMATION PROCESSING METHOD, AND PROGRAM

CROSS REFERENCES TO RELATED APPLICATIONS

The present invention contains subjected matter related to Japanese Patent Application JP 2007-299793 filed in the Japan Patent Office on Nov. 19, 2007, the entire contents of which is incorporated herein by reference.

BACKGROUND OF THE INVENTION

1. Field of the Invention

The present invention relates to an information processing device, an information processing method, and a program.

2. Description of the Related Art

In recent years, mobile telephones and mobile information terminals that are provided with non-contact integrated circuit (IC) cards and non-contact-type IC chips have become widespread, as have communication devices, information processing devices, and the like that are provided with reader/writer functions for communication with non-contact IC cards. Hereinafter, such devices and units are sometimes called non-contact communication devices. A reader/writer and a non-contact IC card can communicate with one another by using a carrier wave of a specific frequency (for example, 13.56 MHz or the like). For example, if a command is transmitted from the reader/writer to cause the non-contact IC card to perform a specified process, the non-contact IC card performs the process in response to the received command and transmits the process results back to the reader/writer in the form of a response signal. In this case, the reader/writer and the non-contact IC card can transmit signals by using a modulation technology called load modulation that modulates the carrier wave by varying an antenna load according to the transmitted data. The non-contact IC card can also use the carrier wave to regenerate a drive power supply and a clock signal.

The non-contact communication device is configured from a communication device for performing non-contact communication with an external communication device and from a secure device (also called a processing device) capable of holding data securely. An application for performing a specified process in response to a received signal and data that are used for the processing by the application are stored in the secure device. For example, a non-contact communication device that has a bill payment function may be provided with a secure device in which are stored data such as information on an amount of money, a bill payment record, and the like, as well as an application that performs data update processing and the like. Thus, because the secure device contains confidential user information and the like, it is provided with a mechanism that prevents such problems as improper alteration of the information and unintentional execution of the application. In other words, the secure device is a tamper-proof device.

SUMMARY OF THE INVENTION

A non-contact communication device provided with one communication device and one secure device and that utilizes a technology like those described above has performed secure data processing to date. However, the applicant of the present invention has assumed that a non-contact communication device will be used that is provided by a plurality of secure devices. In this context, the present applicant has concentrated on a technology for dynamically specifying an application (or a function) held in at least one of the plurality of the secure devices. With current technologies, it is difficult to specify dynamically, in response to a signal acquired from an external communication device, applications that are held in each of the plurality of the secure devices within the non-contact communication device. A method can be conceived that would simply start all of the plurality of the secure devices in response to the signal acquired from the external communication device, that would cause an increase in the amount of electric power that the non-contact communication device consumes.

Accordingly, the present invention addresses the issues described above and provides an information processing device, an information processing method, and a program that are new and improved and that are capable of dynamically selecting, from among a plurality of processing devices, a processing device capable of performing a process in response to a specified processing request.

In order to address the issues described above, according to an embodiment of the present invention, there is provided an information processing device that includes a plurality of processing devices that are each associated with a unique device information item and that also includes a relay device that uses non-contact communication to acquire a specified processing request. Each of the processing devices has at least one processing function associated with a unique function information item. Each of the processing devices includes a function determination portion and a device information item notification portion. When a specified function information item is received from the relay device, the function determination portion determines whether the processing device has the processing function that corresponds to the specified function information item. In a case where the function determination portion determines that the processing device has the processing function that corresponds to the specified function information item, the device information item notification portion transmits the device information item for the processing device to the relay device. The relay device includes a storage portion, a function information item transmission portion, and a device information item recording portion. The storage portion stores the device information items for the processing devices. The function information item transmission portion transmits the specified function information item simultaneously to the plurality of the processing devices. The device information item recording portion records in the storage portion the device information items that are transmitted from the processing devices in accordance with the specified function information item transmitted by the function information item transmission portion. When the relay device receives the processing request for a specified one of the processing functions, it selects one of the processing devices that corresponds to the specified processing function, based on the device information items that are recorded in the storage portion, and transmits the processing request to the selected processing device.

The relay device may also include an electric power saving control portion that one of reduces and stops an electric power supply to each of the processing devices that do not respond to the specified function information item transmitted by the function information item transmission portion.

The relay device may also use the non-contact communication to be supplied with electric power through a carrier wave. In that case, the storage portion may be formed from a volatile memory, and it may be configured such that the device information items that are recorded in the storage portion are deleted if the supply of electric power by the carrier wave is cut off.

The storage portion may also be formed from a non-volatile memory. In that case, the information processing device may also be provided with a storage deletion portion that deletes the device information items that are recorded in the storage portion if the carrier wave is detected when the non-contact communication starts.

The function information item transmission portion, in response to a selection request received using non-contact communication, may also simultaneously transmit to the plurality of the processing devices a specified function information item included in the selection request.

The information processing device may also include a device information item setting portion that, in a case where more than one of the device information items that correspond to the same function information item are recorded in the storage portion, sets one of the device information items to be enabled.

The device information item setting portion may also have a list of the device information items for the processing devices that are associated with each of the function information items and may set the device information item to be enabled based on the device information items that are included in the list of the device information items.

The information processing device may also be one of a mobile telephone and a mobile terminal that has a calling function.

In order to address the issues described above, according to another embodiment of the present invention, there is provided an information processing method for an information processing device that includes a plurality of processing devices that are each associated with a unique device information item and that also includes a relay device that uses non-contact communication to acquire a specified processing request. The information processing method includes a step of transmitting a specified function information item simultaneously from the relay device to the plurality of the processing devices. The information processing method also includes a step of determining by each of the processing devices, when the specified function information item is received from the relay device, whether the processing device, which has at least one processing function associated with a unique function information item, has the processing function that corresponds to the specified function information item. The information processing method also includes a step of transmitting from the processing device to the relay device, in a case where it is determined that the processing device has the processing function that corresponds to the specified function information item, the device information item for the processing device. The information processing method also includes a step of recording, in a storage portion provided in the relay device and that stores the device information items for the processing devices, the device information item transmitted from the processing device in accordance with the specified function information item. When the relay device receives the processing request for a specified one of the processing functions, it selects one of the processing devices that corresponds to the specified processing function, based on the device information items that are recorded in the storage portion, and transmits the processing request to the selected processing device.

In order to address the issues described above, according to another embodiment of the present invention, there is provided a program for an information processing device that includes a plurality of processing devices, each of which is associated with a unique device information item and that also includes a relay device that uses non-contact communication to acquire a specified processing request. The program causes a computer to function as a function determination portion, a device information item notification portion, a function information item transmission portion, a device information item recording portion, and a transmission control portion. When a specified function information item is received from the relay device, the function determination portion determines for each of the processing devices whether the processing device, which has at least one processing function associated with a unique function information item, has the processing function that corresponds to the specified function information item. In a case where the function determination portion determines that the processing device has the processing function that corresponds to the specified function information item, the device information item notification portion transmits the device information item for the processing device from the processing device to the relay device. The function information item transmission portion transmits the specified function information item simultaneously from the relay device to the plurality of the processing devices. The device information item recording portion records, in a storage portion provided in the relay device and that stores the device information items for the processing devices, the device information item transmitted from the processing device in accordance with the specified function information item. When the relay device receives the processing request for a specified one of the processing functions, the transmission control portion causes the relay device to select one of the processing devices that corresponds to the specified processing function, based on the device information items that are recorded in the storage portion, and to transmit the processing request to the selected processing device.

According to the embodiments of the present invention described above, it is possible to select dynamically, from among a plurality of processing devices, a processing device capable of performing a process in response to a specified processing request.

DETAILED DESCRIPTION OF THE PREFERRED EMBODIMENTS

Figure 1:
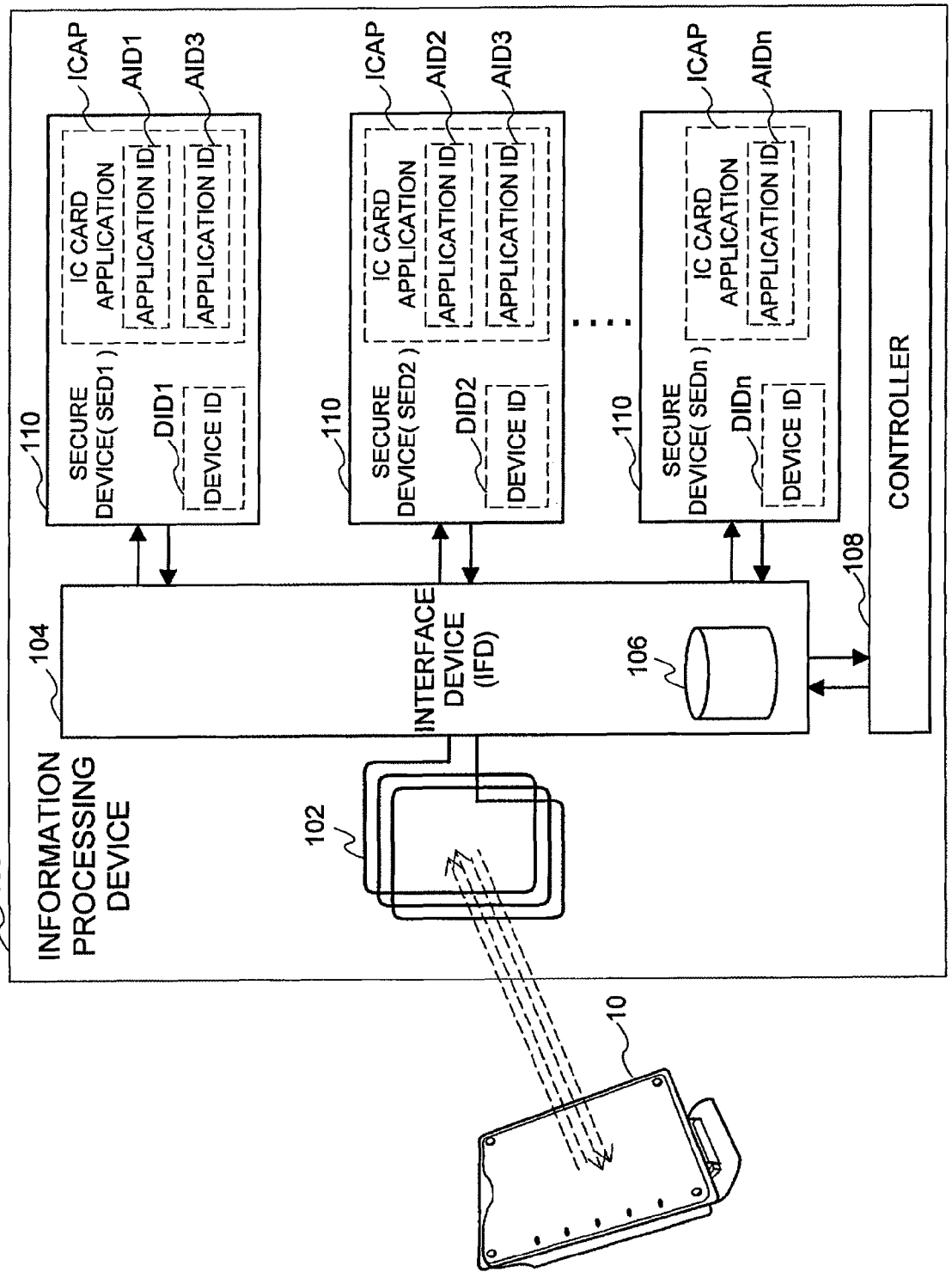
FIG. 1 is an explanatory figure that shows a functional configuration of an information processing device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An embodiment of the present invention will be explained in detail. One feature of the present embodiment is a technology that, in an information processing device that has a plurality of secure devices, holds a device information item about a secure device compatible with a specified selection request and selects the secure device to be used for data processing based on the device information item. Another feature of the present embodiment is a technology that reduces an amount of consumed electric power by performing electric power saving control for the secure devices other than the secure device that corresponds to the held device information item. The technologies will be explained below.

First, a functional configuration of an information processing device 100 according to the present embodiment will be explained with reference to FIG. 1. FIG. 1 is an explanatory figure that shows the functional configuration of the information processing device 100 according to the present embodiment. Note that the information processing device 100 is equivalent to a communication device capable of non-contact communication, a communication terminal, a mobile telephone that has a calling function, a mobile information device, and the like. Of course, a non-contact IC chip and a non-contact IC card that are provided with one of a part and all of the functional configuration described below are also within the technical scope of the disclosure of the present embodiment.

As shown in FIG. 1, the information processing device 100 is mainly configured to include an antenna 102, an interface device (IFD) 104, a controller 108, and a plurality of secure devices (SEDs) 110. Note that the interface device 104 is an example of a relay device. Further, the secure devices 110 are examples of processing devices.

The interface device 104 can perform non-contact communication with an external reader/writer 10 through the antenna 102. The interface device 104 is also connected to the plurality of the secure devices 110 through the controller 108. The interface device 104 also has a storage portion 106 for storing a device ID that will be described later. The storage portion 106 is configured from one of a volatile memory and a non-volatile memory. Note that the controller 108 is a control portion for operating the interface device 104 in response to a user operation. Note that the device ID is an example of the device information item.

As will be described in detail below, the interface device 104 is a portion that, in response to a selection request received from the reader/writer 10 through the antenna 102, selects from among the plurality of the secure devices 110 one of the secure devices 110 in which is stored an application specified by the selection request. The interface device 104 is also a portion that transmits the selection request received from the reader/writer 10 to the one of the secure devices 110 selected according to the selection request. Note that the application corresponds to a processing function of the one of the secure devices 110.

Each of the secure devices 110 is a portion that securely stores at least one IC card application (ICAP; hereinafter called the "application") that performs a specified process in response to a processing request. Each of the secure devices 110 also stores data and the like that are used in the performance of the process by the application. Each of the secure devices 110 also has its own unique identification information item (hereinafter called the device ID (DID)). As will be described in detail below, each of the secure devices 110 can search for one of the applications it holds by referring to an application ID (AID) that identifies one of the applications.

Note that the application ID is an example of a function information item.

Therefore, when any one of the secure devices 110 receives from the interface device 104 the selection request for the application, the secure device 110 searches for the application ID that corresponds to the application and, depending on the search result, transmits its own device ID to the interface device 104. In other words, the secure device 110 searches among the application IDs that it holds for the application ID designated by the selection request. In a case where the application ID is found, the secure device 110 transmits its own device ID to the interface device 104. Note that each of the secure devices 110 may be an embedded type of device and may be a removable type of device.

Figure 2:
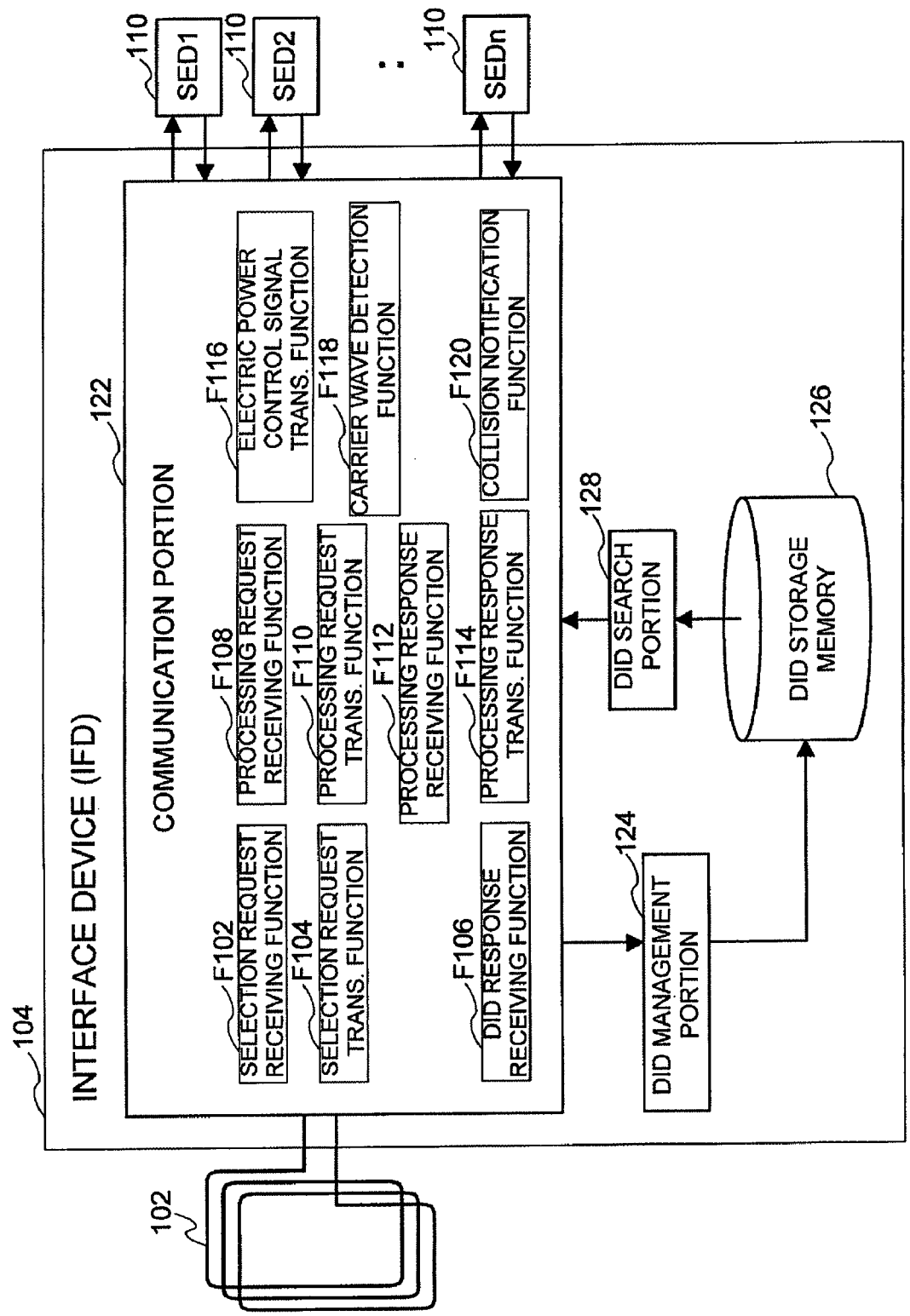
FIG. 2 is an explanatory figure that shows a functional configuration of an interface device (IFD) according to the embodiment.

The functional configuration of the interface device 104 will be explained in greater detail with reference to FIG. 2. FIG. 2 is an explanatory figure that shows the functional configuration of the interface device 104 according to the present embodiment.

As shown in FIG. 2, the interface device 104 is mainly configured from a communication portion 122, a DID management portion 124, a DID storage memory 126, and a DID search portion 128. The DID management portion 124 is a portion that stores in the DID storage memory 126 the device ID transmitted from the communication portion 122. The DID search portion 128 is a portion that finds the device ID stored in the DID storage memory 126. The DID storage memory 126 is a specific example of the storage portion 106. The communication portion 122 is an example of a function information item transmission portion. The DID management portion 124 is an example of a device information item recording portion and an example of a storage deletion portion.

The functions of the communication portion 122 will be explained in detail below. The communication portion 122 has, for example, a selection request receiving function F102, a selection request transmission function F104, a DID response receiving function F106, a processing request receiving function F108, a processing request transmission function F110, a processing response receiving function F112, a processing response transmission function F114, an electric power control signal transmission function F116, a carrier wave detection function F118, and a collision notification function F120. Note that each of the functions may be a part of the functions of the communication portion 122 and may also be configured as a functional block that is independent of the communication portion 122.

The selection request receiving function F102 is a function that receives the selection request from the external reader/writer 10 through the antenna 102. The selection request transmission function F104 is a function that transmits the selection request simultaneously to the plurality of the secure devices 110. The selection request is a request signal that is used to select the secure devices 110 that have the application designated by the reader/writer 10. The selection request includes a specified application ID. Therefore, when the selection request is received by the selection request receiving function F102, the communication portion 122 uses the selection request transmission function F104 to transmit the selection request simultaneously to the plurality of the secure devices 110.

The DID response receiving function F106 is a function that receives the device IDs that are transmitted from the secure devices 110 in response to the selection request transmitted by the selection request transmission function F104.

The communication portion 122 transmits the device IDs that are received by the DID response receiving function F106 to the DID management portion 124. However, in a case where more than one of the secure devices 110 responds to the selection request (where a collision occurs), the communication portion 122 uses the collision notification function F120 to notify the reader/writer 10 that the collision has occurred.

The processing request receiving function F108 is a function that receives the processing request from the reader/writer 10 through the antenna 102. The processing request transmission function F110 is a function that, in a case where the processing request is received by the processing request receiving function F108, transmits the processing request to the secure device 110 that has the device ID found by the DID search portion 128. The processing response receiving function F112 is a function that, after the process is performed by one of the secure devices 110 according to the processing request, receives a processing response transmitted from the secure device 110. The processing response transmission function F114 is a function that transmits to the reader/writer 10 through the antenna 102 the processing response received by the processing response receiving function F112. The processing response may include, for example, a result output by the process, a completion of the process, and information for an error notification.

The electric power control signal transmission function F116 is a function that transmits an electric power control signal that requests one of a reduction in the amount of electric power supplied and a stopping of the electric power supply to the secure devices 110 other than the secure device 110 that transmitted its device ID in response to the selection request. The electric power control signal transmission function F116 also has a function that transmits an electric power control signal that restores the electric power supply state of the secure devices 110 for which one of the amount of supplied electric power was reduced and the electric power supply was stopped. For example, in a case where the carrier wave detection function F118 first detects a carrier wave when the non-contact communication starts, and in a case where the carrier wave detection function F118 does not detect the carrier wave when the non-contact communication ends, the communication portion 122 uses the electric power control signal transmission function F116 to restore the electric power supply state of the secure devices 110.

Figure 3:
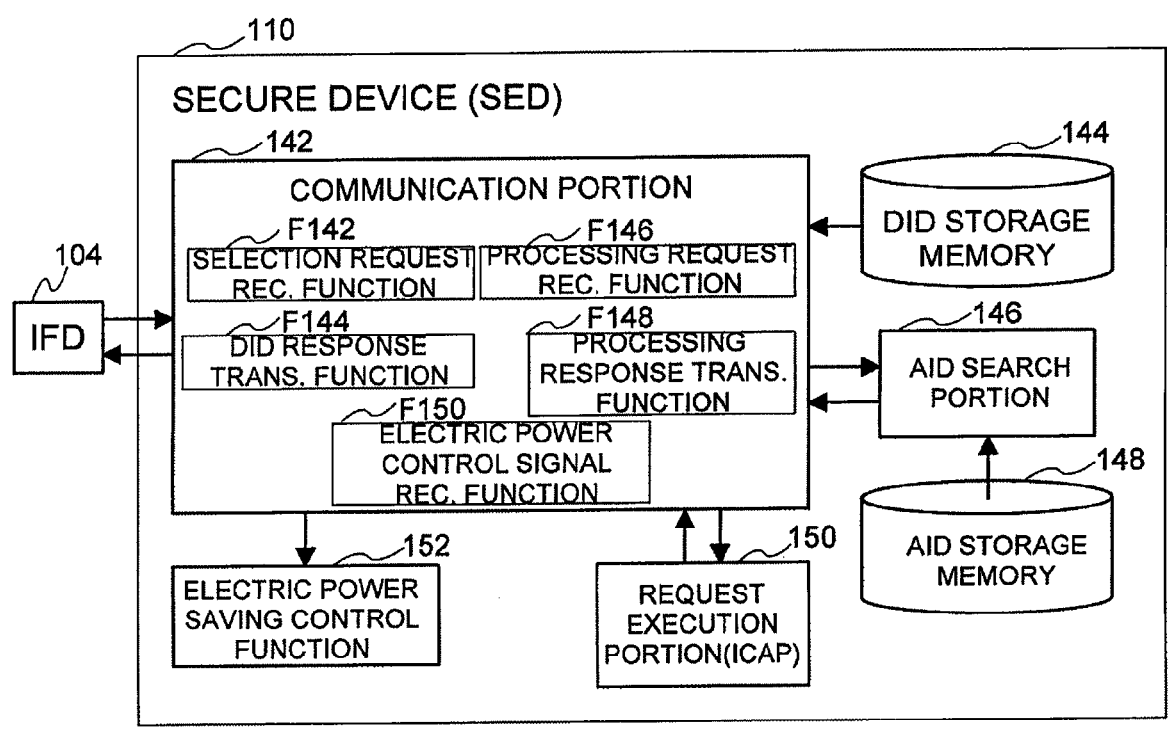
FIG. 3 is an explanatory figure that shows a functional configuration of a security device (SED) according to the embodiment.

A functional configuration of the secure device 110 will be explained in greater detail with reference to FIG. 3. FIG. 3 is an explanatory figure that shows the functional configuration of the security device 110 according to the present embodiment.

As shown in FIG. 3, the secure device 110 is mainly configured from a communication portion 142, a DID storage memory 144, an AID search portion 146, an AID storage memory 148, a request execution portion 150, and an electric power saving control portion 152. Note that the AID search portion 146 is an example of a function determination portion. Further, the communication portion 142 is an example of a device information item notification portion.

The DID storage memory 144 is a storage portion that stores the unique device ID of the secure device 110. The AID storage memory 148 is a storage portion that stores the application IDs that correspond to the applications that the secure device 110 holds. The AID search portion 146 is a portion that searches for a specified application ID among the application IDs that are stored in the AID storage memory 148. For example, the AID search portion 146 may find the application ID designated by the selection request received from the interface device 104 among the application IDs that are stored in the AID storage memory 148 and may notify the communication portion 142 that the designated application ID has been found.

The request execution portion 150 is a portion that executes the processing request received from the interface device 104. After performing the process in accordance with the processing request, the request execution portion 150 transmits to the communication portion 142 a processing response that indicates a result output by the process, completion of the process, abnormal termination of the process, or the like. The electric power saving control portion 152 one of reduces the amount of electric power supplied to the secure device 110 and stops the electric power supply to the secure device 110 in accordance with the electric power control signal received from the interface device 104. Conversely, the electric power saving control portion 152 is also capable of restoring the electric power supply state of the secure device 110 in accordance with the electric power control signal.

The functions of the communication portion 142 will be explained in detail below. The communication portion 142 may have, for example, a selection request receiving function F142, a DID response transmission function F144, a processing request receiving function F146, a processing response transmission function F148, and an electric power control signal receiving function F150. Note that each of the functions may be a part of the functions of the communication portion 142 and may also be configured as a functional block that is independent of the communication portion 142.

The selection request receiving function F142 is a function that receives the selection request from the interface device 104. In a case where the selection request is received by the selection request receiving function F142, the communication portion 142 transmits to the AID search portion 146 the application ID designated by the selection request and causes the AID search portion 146 to issue a response as to whether or not the application ID exists in the AID storage memory 148. The DID response transmission function F144 is a function that, in a case where the application ID designated by the selection request exists in the AID storage memory 148, transmits to the interface device 104 the device ID stored in the a DID storage memory 144.

The processing request receiving function F146 is a function that receives the processing request from the interface device 104. When the processing request is received by the processing request receiving function F146, the communication portion 142 transmits the processing request to the request execution portion 150 and causes the request execution portion 150 to perform the process in accordance with the processing request. The processing response transmission function F148 is a function that transmits to the interface device 104 the processing response acquired from the request execution portion 150. The electric power control signal receiving function F150 is a function that receives the electric power control signal from the interface device 104. When the electric power control signal is received by the electric power control signal receiving function F150, the communication portion 142 transmits the electric power control signal to the electric power saving control portion 152 and causes the electric power saving control portion 152 to control the electric power supply state of the secure device 110.

The functional configuration of the information processing device 100 according to the present embodiment has been explained above. Next, a method of selecting one of the plurality of the secure devices 110 and a process control method that are implemented in the information processing device 100 that has the functional configuration described above will be explained using more detailed examples.

Figure 4:
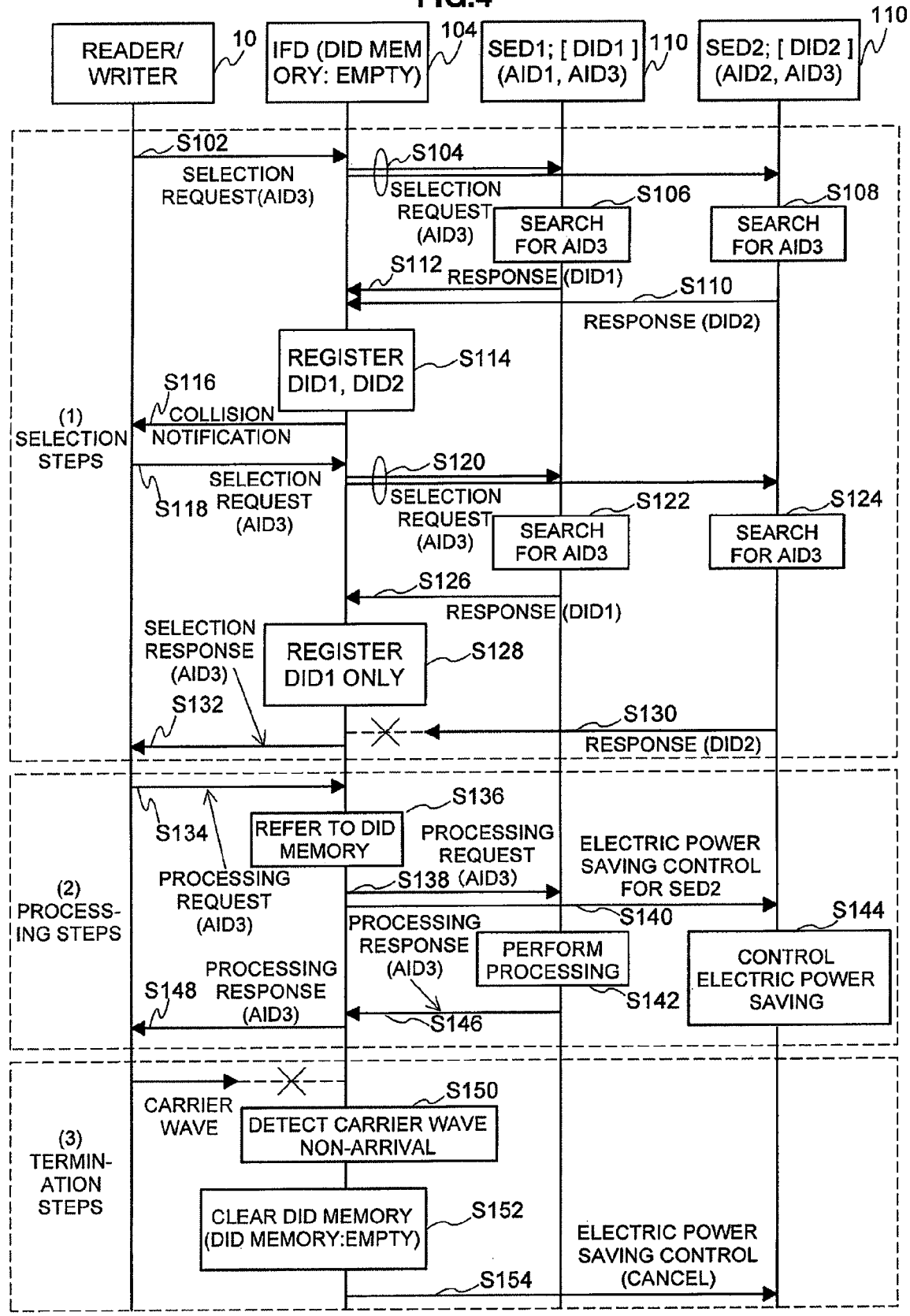
FIG. 4 is an explanatory figure that shows a request processing method according to the embodiment.

First, an application selection sequence according to the present embodiment will be explained with reference to FIG. 4. FIG. 4 is an explanatory figure that shows a flow of the method of selecting one of the plurality of the secure devices 110 and the process control method according to the present embodiment. In the explanation that follows, expressions are used in such a way that the expression "response (DID1)", for example, indicates that the information "DID1" is appended to a response.

In this example, the information processing device 100 is presumed to have one of the interface device 104 and two of the secure devices 110 (SED1, SED2). Further, the DID storage memory 126 of the interface device 104 is presumed to be empty prior to the transmission of the selection request. In addition, two application IDs, AID1 and AID3, are presumed to be stored in the AID storage memory 148 of the secure device 110 that corresponds to the device ID DID1. In the same manner, two application IDs, AID2 and AID3, are presumed to be stored in the AID storage memory 148 of the secure device 110 that corresponds to the device ID DID2.

(1) Selection Steps

First, the sequence from the transmission of the selection request (AID3) up to the point where the secure device 110 that corresponds to the selection request (AID3) is selected will be explained.

First, the selection request (AID3) is transmitted from the reader/writer 10 to the interface device 104 (Step S102). Next, the interface device 104, once it confirms that the DID storage memory 126 is empty, transmits the selection request (AID3) to the two secure devices 110 (SED1, SED2) by broadcasting (Step S104). Next, the secure device 110 (SED1), in response to the selection request (AID3), searches for AID3 in its own AID storage memory 148 (Step S106). In the same manner, the secure device 110 (SED2), in response to the selection request (AID3), searches for AID3 in its own AID storage memory 148 (Step S108).

The secure device 110 (SED2) has AID3 in its AID storage memory 148, so it transmits its own device ID (DID2) as a response to the interface device 104 (Step S110). In the same manner, the secure device 110 (SED1) also has AID3 in its AID storage memory 148, so it transmits its own device ID (DID1) as a response to the interface device 104 (Step S112).

Next, the interface device 104 temporarily registers in the DID storage memory 126 the device IDs (DID1, DID2) that it received from the two secure devices 110 (SED1, SED2) (Step S114). At this point, only DID1 and DID2 are recorded in the DID storage memory 126. Accordingly, the interface device 104 transmits to the reader/writer 10 a collision notification indicating that more than one of the secure devices 110 has the same application and that more than one of the device IDs has been registered (Step S116). Note that the collision notification is performed in accordance with an anti-collision method prescribed by one of ISO 14443-3 and ISO 18092, for example.

This anti-collision processing is performed repeatedly in a case where a plurality of the device IDs are stored in the DID storage memory 126. Therefore, even in an embodiment that has a large number of the secure devices 110, the number of the device IDs is automatically narrowed down to one.

Next, the reader/writer 10 receives the collision notification and retransmits the selection request (AID3) to the interface device 104 (Step S118). The interface device 104 receives the retransmitted selection request (AID3) and transmits the selection request (AID3) to the two secure devices 110 (SED1, SED2) (Step S120). The secure device 110 (SED1) once again searches for AID3, in the same manner as at Step S106 (Step S122), and transmits DID1 as a response to the interface device 104 (Step S126). In the same manner, the secure device 110 (SED2) once again searches for AID3, in the same manner as at Step S108 (Step S124), and transmits DID2 as a response to the interface device 104 (Step S130). However, it is presumed that the processing at Step S130 is performed at least a specified period of time after the processing at Step S126.

Therefore, the interface device 104 stores in the DID storage memory 126 only the DID1 received from the secure device 110 (SED1) (Step S128) and discards the selection response (DID2) from the secure device 110 (SED2). Next, the interface device 104 transmits to the reader/writer 10 the selection response (AID3) that corresponds to the selection request (AID3) (Step S132) and completes the (1) selection steps.

(2) Processing Steps

Next, the sequence from the transmission of the processing request (AID3) through the performing of the process by the secure device 110 in accordance with the processing request (AID3) to the transmission of the processing response (AID3) to the reader/writer 10 will be explained. Note that the (2) processing steps are processing steps that are performed after the reader/writer 10 receives the selection response (AID3) from the interface device 104 in the (1) selection steps.

First, the reader/writer 10 transmits the processing request (AID3) to the interface device 104 (Step S134). The interface device 104, having received the processing request (AID3), refers to the device ID (DID1) stored in the DID storage memory 126 (Step S136). Next, the interface device 104 transmits the processing request (AID3) to the secure device 110 (SED1) that corresponds to the device ID (DID1) (Step S138). The interface device 104 also transmits the electric power control signal to the other secure device 110 (SED2) to perform electric power saving control (Step S140).

The secure device 110 (SED1), having received the processing request (AID3), uses the request execution portion 150 to perform the specified process in accordance with the processing request (AID3) (Step S142), then transmits the processing response (AID3) to the interface device 104 (Step S146). On the other hand, the secure device 110 (SED2), having received the electric power control signal, uses the electric power saving control portion 152 to one of reduce and stop the supply of electric power (Step S144). The interface device 104, having received the processing response (AID3), transmits the processing response (AID3) to the reader/writer 10 (Step S148) and completes the (2) processing steps.

(3) Termination Steps

Finally, the processing sequence in a case where the carrier wave transmitted from the reader/writer 10 is not found will be explained. The interface device 104, having detected that the carrier wave transmitted from the reader/writer 10 is not found (Step S150), deletes the device ID (DID1) recorded in the DID storage memory 126 (Step S152). The interface device 104 also transmits the electric power control signal to cancel the electric power saving state to the secure device 110 (SED2) to which the electric power control signal was transmitted at Step S140 (Step S154). When the electric power saving state is canceled in the secure device 110 (SED2), the (3) termination steps are completed.

The processing sequence in a case where more than one of the secure devices 110 has the same application has been explained above. If the sequence described above is followed, the desired process becomes possible, regardless of the configuration of the secure devices 110, as long as the reader/writer 10 designates an application ID that is suitable for the desired process and transmits the selection request and the processing request. Furthermore, because the interface device 104 is configured such that it transmits the selection request simultaneously to the plurality of the secure devices 110, no processing that has to do with transmission timing control and the like is required. Moreover, because the secure devices 110 that are not used for any given process are able to conserve electric power, it is possible to reduce the amount of electric power consumed. The manufacturing cost can also be reduced in a case where a volatile memory is used for the DID storage memory 126, and because the data in the memory is automatically deleted if the carrier wave is not detected, no memory deletion control is required at Step S152. This can reduce the number of steps and make it possible to simplify the circuit configuration, thus contributing to further reduction of the manufacturing cost and to making the information processing device 100 itself more compact.

Figure 5:
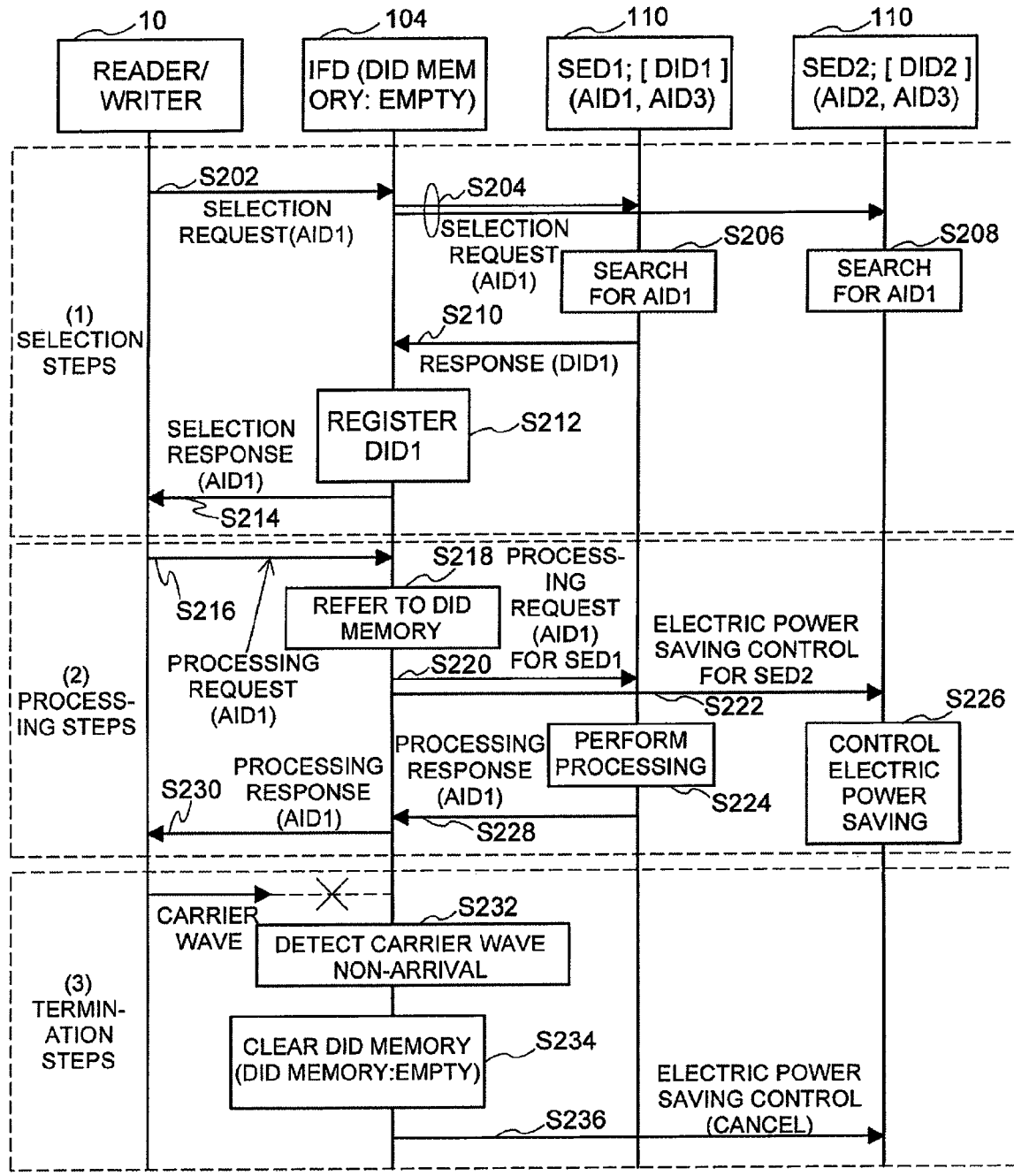
FIG. 5 is an explanatory figure that shows a request processing method according to the embodiment.

Next, another application selection sequence according to the present embodiment will be explained with reference to FIG. 5. FIG. 5 is an explanatory figure that shows a flow of the method of selecting one of the plurality of the secure devices 110 and the process control method according to the present embodiment.

In this example, the information processing device 100 is presumed to have one of the interface device 104 and two of the secure devices 110 (SED1, SED2). Further, the DID storage memory 126 of the interface device 104 is presumed to be empty prior to the transmission of the selection request. In addition, two application IDs, AID1 and AID3, are presumed to be stored in the AID storage memory 148 of the secure device 110 that corresponds to the device ID DID1. In the same manner, two application IDs, AID2 and AID3, are presumed to be stored in the AID storage memory 148 of the secure device 110 that corresponds to the device ID DID2.

(1) Selection Steps

First, the sequence from the transmission of the selection request up to the point where the secure device 110 that corresponds to the selection request is selected will be explained.

First, the selection request (AID1) is transmitted from the reader/writer 10 to the interface device 104 (Step S202). Next, the interface device 104, once it confirms that the DID storage memory 126 is empty, transmits the selection request (AID1) to the two secure devices 110 (SED1, SED2) by broadcasting (Step S204). Next, the secure device 110 (SED1), in response to the selection request (AID1), searches for AID1 in its own AID storage memory 148 (Step S206). In the same manner, the secure device 110 (SED2), in response to the selection request (AID1), searches for AID1 in its own AID storage memory 148 (Step S208).

The secure device 110 (SED1) has AID1 in its AID storage memory 148, so it transmits its own device ID (DID1) as a response to the interface device 104 (Step S210). On the other hand, the secure device 110 (SED2) does not have in its AID storage memory 148, so it does not transmit a response to the interface device 104. Next, the interface device 104 temporarily registers in the DID storage memory 126 the device ID (DID1) that it received from the secure device 110 (SED1) (Step S212). At this point, only the one device ID (DID1) is recorded in the DID storage memory 126. Therefore, the interface device 104 transmits the selection response (AID1) to the reader/writer 10 (Step S214) and completes the (1) selection steps without transmitting the collision notification.

(2) Processing Steps

Next, the sequence from the transmission of the processing request (AID1) through the performing of the process by the secure device 110 in accordance with the processing request (AID1) to the transmission of the processing response (AID1) to the reader/writer 10 will be explained. Note that the (2) processing steps are processing steps that are performed after the reader/writer 10 receives the selection response (AID1) from the interface device 104 in the (1) selection steps.

First, the reader/writer 10 transmits the processing request (AID1) to the interface device 104 (Step S216). The interface device 104, having received the processing request (AID1), refers to the device ID (DID1) stored in the DID storage memory 126 (Step S218). Next, the interface device 104 transmits the processing request (AID1) to the secure device 110 (SED1) that corresponds to the device ID (DID1) (Step S220). The interface device 104 also transmits the electric power control signal to the other secure device 110 (SED2) to perform electric power saving control (Step S222).

The secure device 110 (SED1), having received the processing request (AID1), uses the request execution portion 150 to perform the specified process in accordance with the processing request (AID1) (Step S224), then transmits the processing response (AID1) to the interface device 104 (Step S228.) On the other hand, the secure device 110 (SED2), having received the electric power control signal, uses the electric power saving control portion 152 to one of reduce and stop the supply of electric power (Step S226). The interface device 104, having received the processing response (AID1), transmits the processing response (AID1) to the reader/writer 10 (Step S230) and completes the (2) processing steps.

(3) Termination Steps

Finally, the processing sequence in a case where the carrier wave transmitted from the reader/writer 10 is not found will be explained. The interface device 104, having detected that the carrier wave transmitted from the reader/writer 10 is not found (Step S232), deletes the device ID (DID1) recorded in the DID storage memory 126 (Step S234). The interface device 104 also transmits the electric power control signal to cancel the electric power saving state to the secure device 110 (SED2) to which the electric power control signal was transmitted at Step S222 (Step S236). When the electric power saving state is canceled in the secure device 110 (SED2), the (3) termination steps are completed.

The processing sequence in a case where a selection request is not made for an application ID held by more than one of the secure devices 110 has been explained above. In this case, the anti-collision processing is not performed, so the overall flow of the processing is simple.

Figure 6:
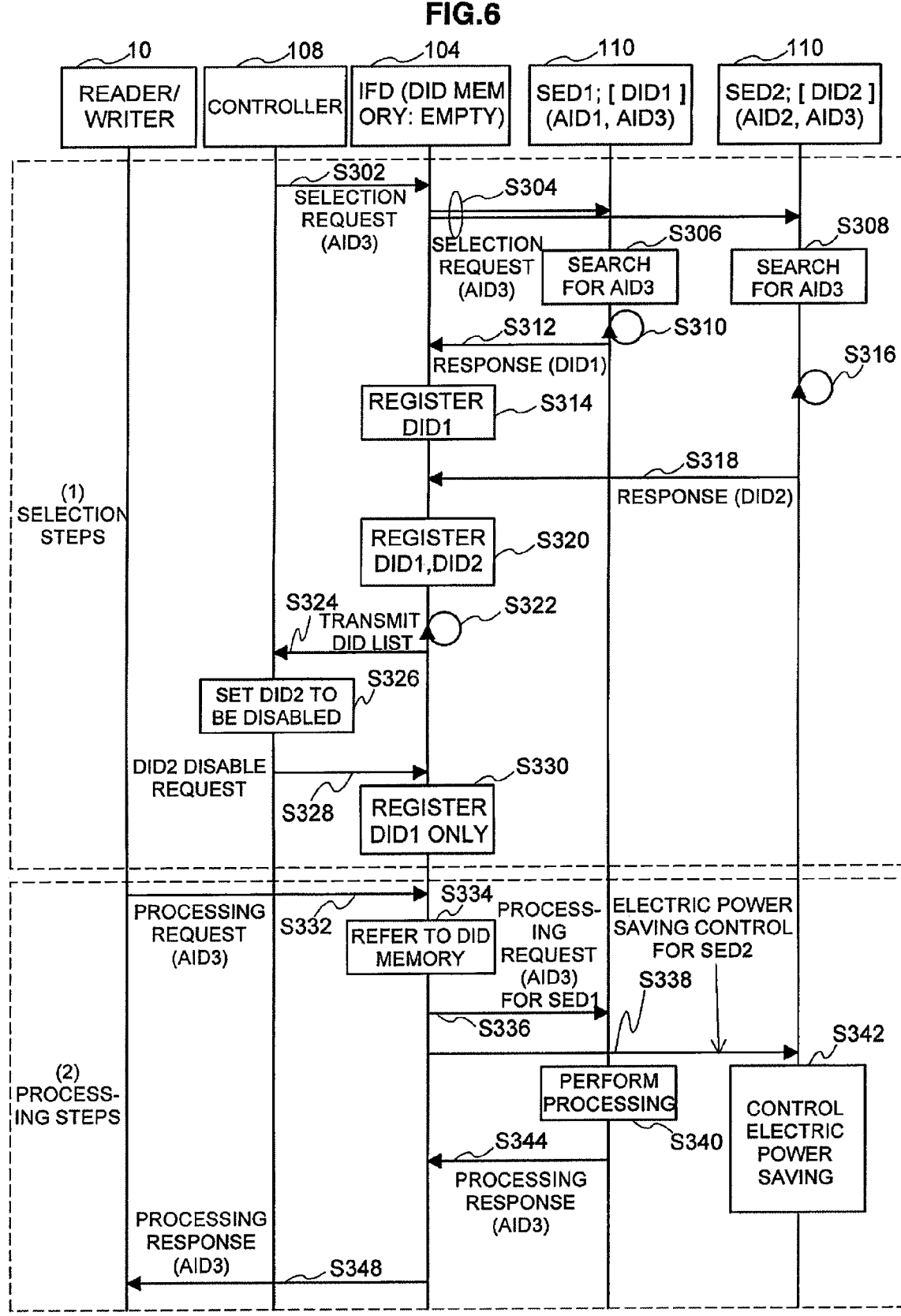
FIG. 6 is an explanatory figure that shows a request processing method according to the embodiment.

Next, another application selection sequence according to the present embodiment will be explained with reference to FIG. 6. FIG. 6 is an explanatory figure that shows a flow of the method of selecting one of the plurality of the secure devices 110 and the process control method according to the present embodiment. In the explanation that follows, expressions are used in such a way that the expression "response (DID1)", for example, indicates that the information "DID1" is appended to a response.

In this example, the information processing device 100 is presumed to have one of the interface device 104 and two of the secure devices 110 (SED1, SED2). Further, the DID storage memory 126 of the interface device 104 is presumed to be empty prior to the transmission of the selection request. In addition, two application IDs, AID1 and AID3, are presumed to be stored in the AID storage memory 148 of the secure device 110 that corresponds to the device ID DID1. In the same manner, two application IDs, AID2 and AID3, are presumed to be stored in the AID storage memory 148 of the secure device 110 that corresponds to the device ID DID2.

(1) Selection Steps

First, the sequence from the transmission of the selection request (AID3) by the controller 108 up to the point where the secure device 110 that corresponds to the selection request (AID3) is selected will be explained. Note that the controller 108 is an example of a device information item setting portion.

First, the selection request (AID3) is transmitted from the controller 108 to the interface device 104 (Step S302). Next, the interface device 104, once it confirms that the DID storage memory 126 is empty, transmits the selection request (AID3) to the two secure devices 110 (SED1, SED2) by broadcasting (Step S304). Next, the secure device 110 (SED1), in response to the selection request (AID3), searches for AID1 in its own AID storage memory 148 (Step S306). In the same manner, the secure device 110 (SED2), in response to the selection request (AID3), searches for AID3 in its own AID storage memory 148 (Step S308).

The secure device 110 (SED1) has AID3 in its AID storage memory 148, so it transmits its own device ID (DID1) as a response to the interface device 104 (Step S312). The secure device 110 (SED2) also has AID3 in its AID storage memory 148, so it also transmits its own device ID (DID2) as a response to the interface device 104 (Step S318). At this time, the secure device 110 (SED1) may respond to the interface device 104 after waiting for a specified period of time (Step S310) in order to separate the time at which it responds from the time at which the other secure device 110 responds. In the same manner, the secure device 110 (SED2) may also respond to the interface device 104 after waiting for a specified period of time (Step S316). Note that the waiting time may be determined by using a timer that outputs a random length of time, for example.

Next, the interface device 104 temporarily registers in the DID storage memory 126 the device ID (DID1) received from the secure device 110 (SED1) that responds first (Step S314). At this time, only DID1 is recorded in the DID storage memory 126. Next, the interface device 104 additionally registers in the DID storage memory 126 the device ID (DID2) received from the secure device 110 (SED2) that responds later (Step S320). At this time, both DID1 and DID2 are recorded in the DID storage memory 126. The interface device 104 may also, for example, wait for a specified period of time after the selection request (AID3) is transmitted at Step S304 (Step S322), then register in the DID storage memory 126 the responses from the secure devices 110 that arrive within the specified period of time.

After the specified period of time elapses, the interface device 104 transmits to the controller 108 a list of the device IDs (DID1, DID2) that are recorded in the DID storage memory 126 (Step S324). The controller 108 may, for example, present to the user the list of the device IDs (DID1, DID2) that it receives and, in response to a user operation, set the device ID (DID2) to be disabled (Step S326). At this time, the controller 108 may also automatically set the device ID (DID2) to be disabled based on information about the secure devices 110, such as priorities and the like, for example. After setting the device ID (DID2) to be disabled, the controller 108 transmits a disable request (DID2) to the interface device 104 to disable the device ID (DID2) that has been set (Step S328). Having received the disable request (DID2), the interface device 104 deletes from the DID storage memory 126 the device ID (DID2) designated by the disable request (DID2) (Step S330) and completes the (1) selection steps. At this time, only DID1 is recorded in the DID storage memory 126.

(2) Processing Steps

Next, the sequence from the transmission of the processing request (AID3) through the performing of the process by the secure device 110 in accordance with the processing request (AID3) to the transmission of the processing response (AID3) to the reader/writer 10 will be explained. Note that the (2) processing steps are processing steps that are performed after the (1) selection steps are completed.

First, the reader/writer 10 transmits the processing request (AID3) to the interface device 104 (Step S332). The interface device 104, having received the processing request (AID3), refers to the device ID (DID1) stored in the DID storage memory 126 (Step S334). Next, the interface device 104 transmits the processing request (AID3) to the secure device 110 (SED1) that corresponds to the device ID (DID1) (Step S336). The interface device 104 also transmits the electric power control signal to the other secure device 110 (SED2) to perform electric power saving control (Step S338).

The secure device 110 (SED1), having received the processing request (AID3), uses the request execution portion 150 to perform the specified process in accordance with the processing request (AID3) (Step S340), then transmits the processing response (AID3) to the interface device 104 (Step S344). On the other hand, the secure device 110 (SED2), having received the electric power control signal, uses the electric power saving control portion 152 to one of reduce and stop the supply of electric power (Step S342). The interface device 104, having received the processing response (AID3), transmits the processing response (AID3) to the reader/writer 10 (Step S348) and completes the (2) processing steps.

The processing sequence in a case where the controller 108 is used to select one of the secure devices 110 when more than one of the secure devices 110 has the same application has been explained above. Using the configuration described above makes it possible for the user to select, one of in advance and as a part of the sequence, a desired secure device 110 from among a plurality of types of the secure devices 110. This makes it possible to implement at will an embodiment suited to the user's circumstances.

A preferred embodiment of the present invention has been explained above. Using the technology described above produces effects such as those described below. (1) It is possible to prevent a collision from occurring even if the same IC card application is registered in more than one of the secure devices 110. (2) Even if the same non-contact IC card application is registered in more than one of the secure devices 110, the user can use the desired IC card application without being aware that more than one of the secure devices 110 exists. (3) In a case where the same non-contact IC card application is registered in more than one of the secure devices 110, the user can knowingly specify one of the secure devices 110 and use the IC card application in the specified secure device 110. (4) The amount of electric power consumed can be limited by putting the secure devices 110 that are not being used for the processing of the desired IC card application into the electric power saving state. The processing of the IC card application can therefore be performed at the minimum required electric power. (5) Using a transaction to specify one of the secure devices 110 makes it unnecessary for the interface device 104 always to store connection information for the secure devices 110, so a non-volatile memory is not required in the interface device 104. It is therefore possible to use a less expensive volatile memory.

Figure 7:
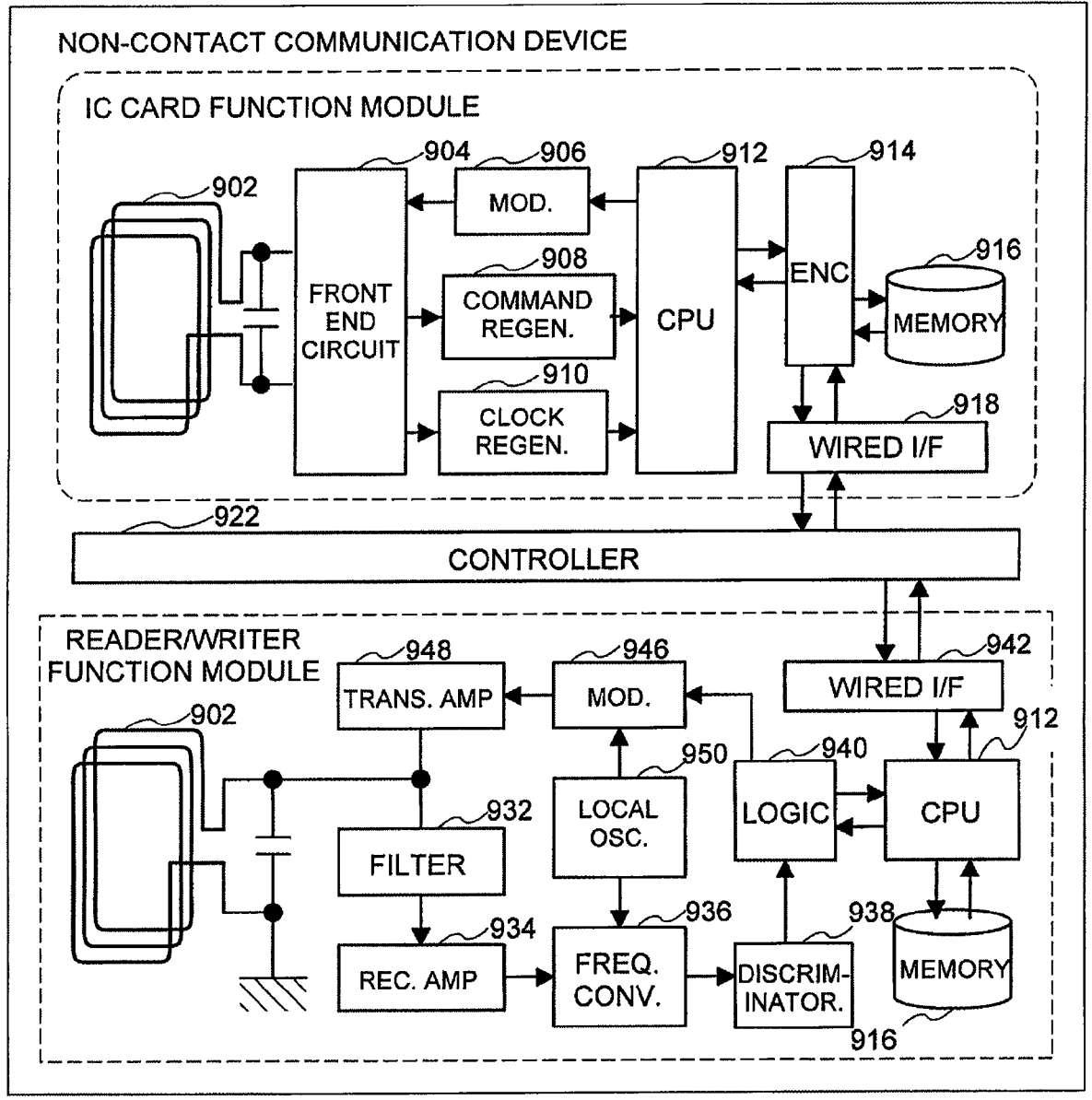
FIG. 7 is an explanatory figure that shows an example of a device configuration of a non-contact communication device.

An example of a device configuration of a non-contact communication device capable of implementing the functions of the devices described above will be explained briefly with reference to FIG. 7. FIG. 7 is an explanatory figure that shows the example of the device configuration of the non-contact communication device. Note that the functions of the devices described above may also be implemented using only a portion of the configuring elements of the non-contact communication device. Note further that configuring elements that have duplicate reference numerals may also be configured from a single hardware resource.

As shown in FIG. 7, the non-contact communication device is mainly configured from an IC card function module, a reader/writer function module, and a controller 922.

The IC card function module is configured from an antenna 902, a front end circuit 904, a modulator 906, a command regenerator 908, a clock regenerator 910, a control circuit (CPU) 912, an encryption circuit 914, a memory 916, and a wired interface circuit 918, for example.

The antenna 902 is configured from a loop antenna, and it receives commands and electric power by being magnetically coupled to a loop antenna of a reader/writer. The front end circuit 904 generates direct current electric power by rectifying a carrier wave output from the reader/writer. The front end circuit 904 also divides the 13.56 MHz frequency of the received carrier wave and inputs the carrier wave to the command regenerator 908 and the clock regenerator 910. The command regenerator 908 regenerates a command based on the input carrier wave and inputs the command to the control circuit 912. Based on the input carrier wave, the clock regenerator 910 regenerates a clock signal for driving a logic circuit and inputs the clock signal to the control circuit 912. The front end circuit 904 supplies regenerated electric power to the control circuit 912.

When the electric power is supplied to all of the circuits, the control circuit 912 drives each circuit according to the received command. Note that data output by the control circuit 912 is encrypted by the encryption circuit 914 and stored in the memory 916. Note that the memory 916 may be a storage device that stores information one of magnetically, optically, and magneto-optically, and may also be a semiconductor storage device used in a read only memory (ROM), a random access memory (RAM), or the like.

In a case where the encrypted data stored in the memory 916 is transmitted, the encrypted data is modulated by the modulator 906. Based on the modulated encrypted data, the front end circuit 904 varies the load impedance at a feeding point of the antenna 902 such that the magnetic field induced by the antenna 902 is varied according to the load impedance. The variations of the magnetic field transmit the encrypted data by inducing variations in the current that flows in the magnetically coupled loop antenna of the reader/writer.

The control circuit 912 may also be controlled by the controller 922 through the wired interface circuit 918. It is also possible for the IC card function module to transmit and receive information to and from the reader/writer function module, which is described below, through an interface I/F (not shown in FIG. 7). This makes it possible for the IC card function module and the reader/writer function module to control one another and for one to control the other.

The reader/writer function module is configured from the antenna 902, a filter 932, a receiving amp 934, a frequency converter 936, a discriminator 938, a logic circuit 940, the control circuit 912, the memory 916, a wired interface circuit 942, a modulator 946, a local oscillator 950, and a transmission amp 948, for example.

The reader/writer function module supplies commands and electric power by utilizing magnetic coupling to a non-contact IC card or the like. The reader/writer function module uses the control circuit 912 to supply electric power to and activate the non-contact IC card or the like, then starts communication in accordance with a specified transmission protocol. At this time, the reader/writer function module establishes a communication connection and performs anti-collision processing, authentication processing, and the like.

The reader/writer function module uses the local oscillator 950 to generate the carrier wave. In a case where information is transmitted, the control circuit 912 first reads data from the memory 916 and transmits the data to the logic circuit 940. Then the modulator 946 modulates the carrier wave that was generated by the local oscillator 950, based on a signal output from the logic circuit 940. The transmission amp 948 amplifies the modulated wave output from the modulator 946 and transmits the amplified wave through the antenna 902.

On the other hand, in a case where information is received, the modulated wave received through the antenna 902 is first passed through the filter 932, then input to the receiving amp 934. The signal is then amplified by the receiving amp 934, the signal frequency is converted by the frequency converter 936, and the signal is input to the logic circuit 940. The signal output from the logic circuit 940 is stored in the memory 916 by the control circuit 912. The signal may also be transmitted to the external controller 922 through the wired interface circuit 942.

The example of the device configuration of the non-contact communication device has been explained above. The non-contact communication device may be, for example, an information processing device such as a mobile telephone, a mobile information terminal, a personal computer, and the like, and may also be a game device, a home information appliance, and the like. Furthermore, various types of devices that include one of all of and a part of the functions and the configuring elements of the non-contact communication device described above are also included within the technical scope of the embodiment described above. Moreover, it is obvious that a program that causes a computer to perform a function of one of the configuring elements described above and a storage medium in which the program is stored are also included within the technical scope of the embodiment described above.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
 a plurality of processing devices each associated with a respective unique device information item;
 a relay device configured to acquire a specified processing request using non-contact communication, wherein
 each of the processing devices include at least one processing function associated with a unique function information item, and comprise
  a function determination portion configured to determine whether the processing device includes a processing function corresponding to a specified function information item when the specified function information item is received from the relay device, and
  a device information item notification portion configured to transmit the device information item for the processing device to the relay device when the function determination portion determines that the processing device includes the processing function corresponding to the specified function information item, and the relay device includes
 a storage portion configured to store the device information items corresponding to the processing devices, a function information item transmission portion configured to transmit the specified function information item simultaneously to the plurality of the processing devices, and a device information item recording portion configured to record, in the storage portion, the device information items transmitted from the processing devices in accordance with the specified function information item transmitted by the function information item transmission portion, and the relay device is configured to select one of the processing devices that corresponds to the specified processing function based on the device information items that are recorded in the storage portion, and transmit the processing request to the selected processing device when the relay device receives the processing request for a specified one of the processing functions.

2. The information processing device according to claim 1, wherein the relay device further comprises:

an electric power saving control portion configured to reduce or stop an electric power supply to each of the processing devices that do not respond to the specified function information item transmitted by the function information item transmission portion.

3. The information processing device according to claim 1, wherein the relay device uses the non-contact communication to be supplied with electric power through a carrier wave.

4. The information processing device according to claim 3, wherein the device information items recorded in the storage portion are deleted if the supply of electric power by the carrier wave is cut off.

5. The information processing device according to claim 1, wherein the storage portion is formed from a volatile memory.

6. The information processing device according to claim 1, further comprising:

a storage deletion portion configured to delete the device information items recorded in the storage portion if a carrier wave is detected when the non-contact communication starts.

7. The information processing device according to claim 1, wherein the function information item transmission portion is configured to simultaneously transmit a specified function information item included in the selection request to the plurality of processing devices in response to a selection request received using non-contact communication.

8. The information processing device according to claim 1, further comprising:

a device information item setting portion configured to set one of the device information items to be enabled when more than one of the device information items that correspond to the same function information item are recorded in the storage portion.

9. The information processing device according to claim 8, wherein the device information item setting portion includes a list of the device information items for the processing devices associated with each of the function information items and sets the device information item to be enabled based on the device information items included in the list of the device information items.

10. The information processing device according to claim 1, wherein the information processing device is one of a mobile telephone and a mobile terminal that includes a calling function.

11. An information processing method for an information processing device that includes a plurality of processing devices each associated with a unique device information item and a relay device that uses non-contact communication to acquire a specified processing request, the information processing method comprising:

transmitting a specified function information item simultaneously from the relay device to the plurality of processing devices;

determining by each of the processing devices, when the specified function information item is received from the relay device, whether the processing device, which has at least one processing function associated with a unique function information item, has the processing function corresponding to the specified function information item;

transmitting from the processing device to the relay device the device information item for the processing device when the determining determines that the processing device has the processing function corresponding to the specified function information item; and recording, in a storage portion provided in the relay device and that stores the device information items for the processing devices, the device information item transmitted from the processing device in accordance with the specified function information item, wherein the relay device selects one of the processing devices that corresponds to the specified processing function based on the device information items recorded in the storage portion, and transmits the processing request to the selected processing device when the relay device receives the processing request for a specified one of the processing functions.

12. The method according to claim 11, further comprising:
reducing an electric power supply to each of the processing devices that do not respond to the specified function information item transmitted by the relay device.

13. The method according to claim 11, further comprising:
supplying power to the relay device using a carrier wave of the non-contact communication.

14. The method of claim 13, further comprising:
deleting the device information items recorded in the storage portion if the supply of electric power by the carrier wave is cut off.

15. The method according to claim 11, further comprising:
deleting the device information items recorded in the storage portion if a carrier wave is detected when the non-contact communication starts.

16. The method of claim 11, further comprising:
setting one of the device information items to be enabled when more than one of the device information items that correspond to the same function information item are recorded in the storage portion.

17. The method of claim 16, further comprising:
setting the device information item to be enabled based on device information items included in a list of the device information items for the processing devices associated with each of the function information items.

18. A non-transitory computer-readable recording medium which includes a computer program, which when executed by an information processing device that includes a plurality of processing devices, each of which is associated with a unique device information item and that also includes a relay device that uses non-contact communication to acquire a specified processing request, causes the information processing device to perform a method comprising:

transmitting a specified function information item simultaneously from the relay device to the plurality of processing devices;

determining by each of the processing devices, when the specified function information item is received from the relay device, whether the processing device, which has at least one processing function associated with a unique function information item, has the processing function corresponding to the specified function information item;

transmitting from the processing device to the relay device the device information item for the processing device when the determining determines that the processing device has the processing function corresponding to the specified function information item; and recording, in a storage portion provided in the relay device and that stores the device information items for the processing devices, the device information item transmitted from the processing device in accordance with the specified function information item, wherein the relay device selects one of the processing devices that corresponds to the specified processing function based on the device information items recorded in the storage portion, and transmits the processing request to the selected processing device when the relay device receives the processing request for a specified one of the processing functions.

19. An interface device, comprising:

a first interface configured to receive a process selection request transmitted via non-contact communication from a device remote from the interface device, wherein the first interface includes an antenna that is configured to be magnetically coupled to an antenna of the device remote from the interface device;

a second interface configured to broadcast the process selection request to a plurality of processing devices, and receive a response from at least one of the plurality of processing devices that includes a device identification corresponding to the at least one of the plurality of processing devices;

a memory configured store the device identification received from the at least one of the plurality of processing devices;

the first interface configured to transmit a selection response to the device remote from the interface device, and receive a processing request from the device remote from the interface device based on transmitted selection response; and a processor configured to refer to the memory and forward the processing request to one of the plurality of processing devices based on the stored device identification.

20. The interface device according to claim 19, wherein the second interface is configured to receive a processing response from the one of the plurality of processing devices after the at least one of the plurality of processing devices has performed a process corresponding to the processing request.

21. The interface device according to claim 20, wherein the first interface is configured to transmit the processing response to the device remote from the interface device.

* * * * *